United States Patent [19]

Falk et al.

[11] Patent Number: 5,104,234
[45] Date of Patent: Apr. 14, 1992

[54] AIR COOLED THERMOCOUPLE LANCE

[75] Inventors: Richard A. Falk, Hillsboro Beach, Fla.; James A. Behring, Waukesha, Wis.

[73] Assignee: Midwest Instrument Co., Inc., Hartland, Wis.

[21] Appl. No.: 654,817

[22] Filed: Feb. 13, 1991

[51] Int. Cl.$^5$ .......................... G01K 1/12; G01K 7/04
[52] U.S. Cl. ....................... 374/140; 136/234
[58] Field of Search .............. 136/230, 231, 232, 233, 136/234; 374/179, 140, 139

[56] References Cited

U.S. PATENT DOCUMENTS

| | | | |
|---|---|---|---|
| 2,493,078 | 1/1950 | Mead | 136/234 |
| 3,080,755 | 3/1963 | Percy | 374/125 |
| 3,250,125 | 5/1966 | Bonn | 136/234 |
| 3,301,715 | 1/1967 | Gerrard et al. | 136/233 |
| 3,610,601 | 10/1971 | Bishop, Jr. | 374/140 |
| 3,672,222 | 6/1972 | Stelts et al. | 374/140 |
| 3,862,574 | 1/1975 | Antoine et al. | 136/231 |
| 3,882,726 | 5/1975 | Smejkal | 374/140 |
| 4,272,989 | 6/1981 | Rymarchyk et al. | 136/234 |
| 4,521,639 | 6/1985 | Falk | 374/139 |
| 4,747,883 | 5/1988 | Krumwiede et al. | 136/234 |
| 4,776,705 | 10/1988 | Najjar et al. | 136/234 |
| 4,863,283 | 9/1989 | Falk | 374/179 |
| 4,881,824 | 11/1989 | Falk et al. | 374/140 |

FOREIGN PATENT DOCUMENTS

| | | | |
|---|---|---|---|
| 0583781 | 9/1959 | Canada | 374/179 |
| 3447830 | 7/1986 | Fed. Rep. of Germany | 136/234 |
| 0564346 | 6/1957 | Italy | 374/179 |
| 0807128 | 1/1959 | United Kingdom | 374/179 |
| 1243028 | 8/1971 | United Kingdom | 374/140 |

Primary Examiner—William A. Cuchlinski, Jr.
Assistant Examiner—Diego F. F. Gutierrez
Attorney, Agent, or Firm—Fuller, Ryan & Hohenfeldt

[57] ABSTRACT

A lance thermocouple of the type used for immersion in molten metal baths is provided with means for cooling by passage of low pressure air through the interior of the thermocouple connector. Radial passageways intersecting with a central bore are provided. Optionally the air or other cooling gas is cooled further by flow through a conduit wrapped with a cooling coil containing cooling water.

8 Claims, 2 Drawing Sheets

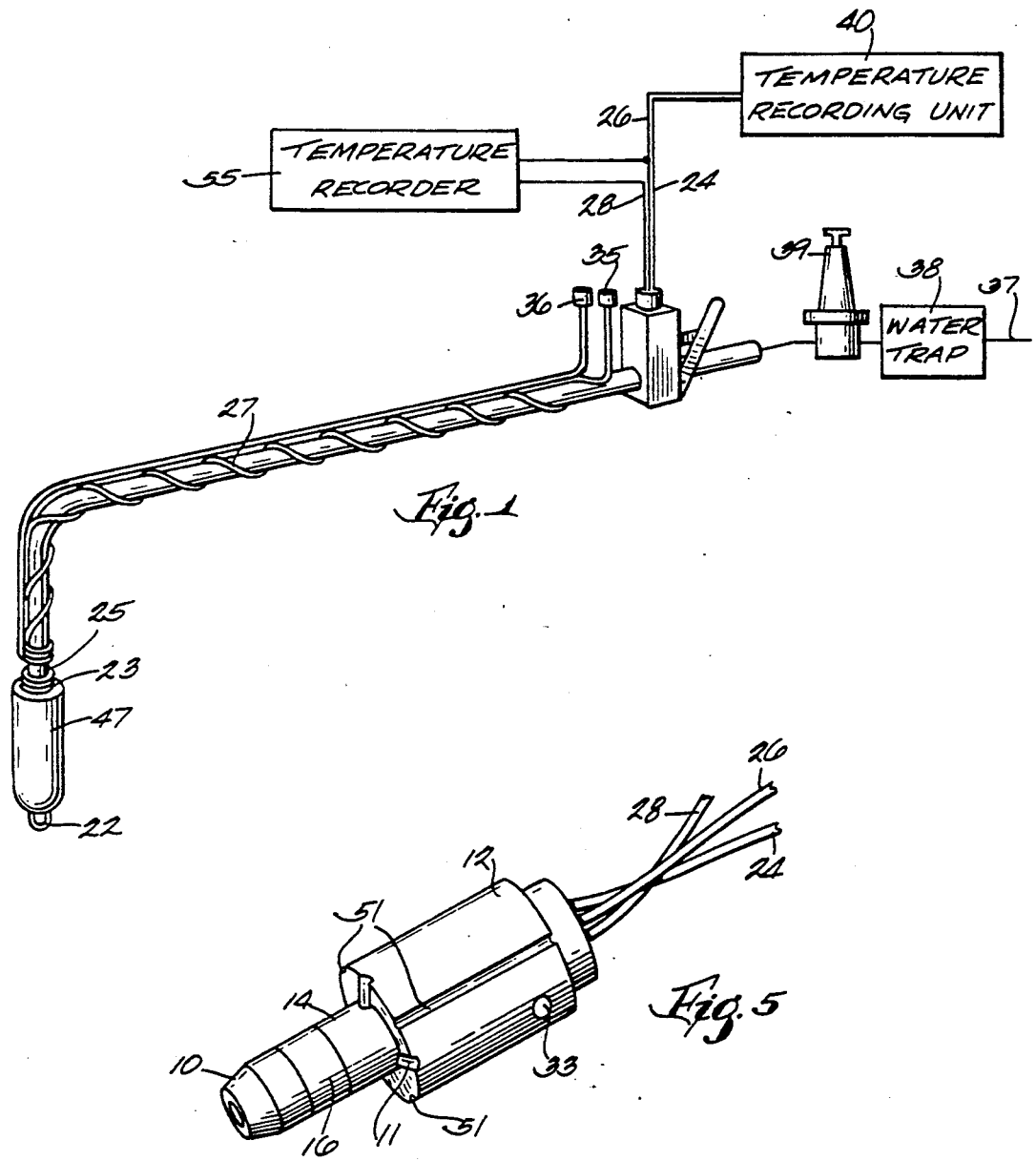

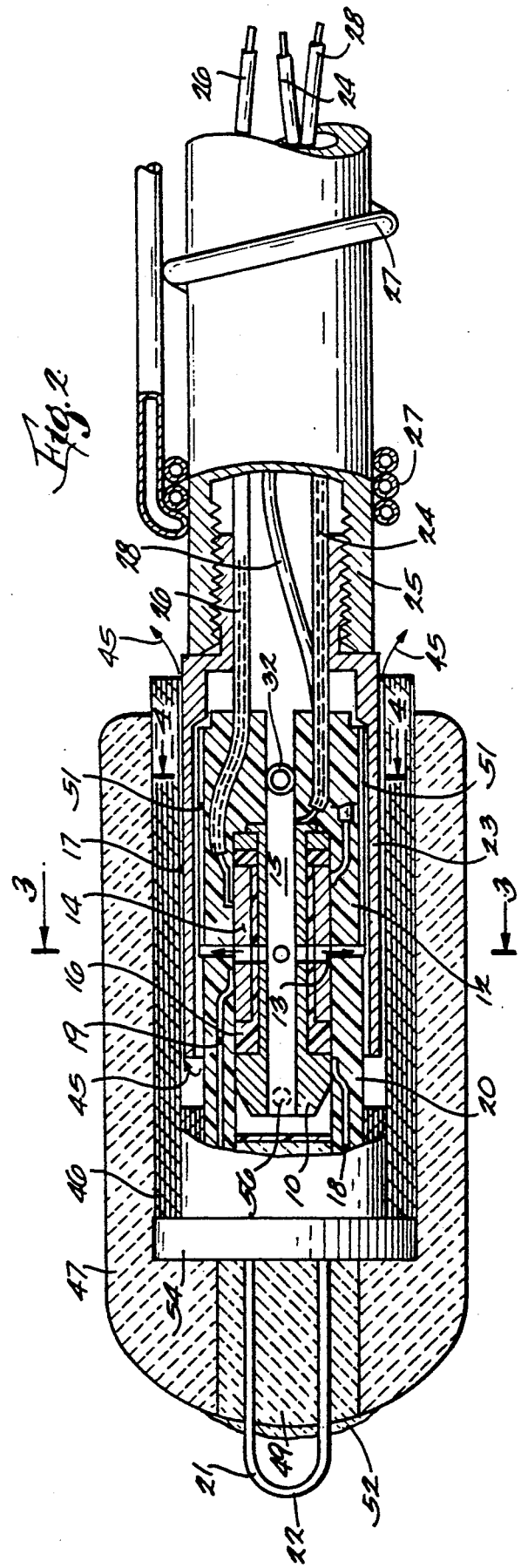

AIR COOLED THERMOCOUPLE LANCE

BACKGROUND OF THE INVENTION

This invention relates to immersion thermocouple sensors used for multiple temperature measurements in molten irons, steels, and other metal baths during the process of manufacture, refining, or casting of such metals. More particularly, this invention relates to thermocouples which are intended for multiple use and which are cooled or kept at constant temperature internally by the flow of a gaseous cooling medium such as air.

Various immersion thermocouples are commercially available for use in measuring the temperatures of molten metal baths. Some thermocouples are intended for single use and others are intended for multiple use. One such multiple use thermocouple device is described in U.S. Pat. No. 4,521,639 issued June 4, 1985. A single use thermocouple assembly is illustrated by U.S. Pat. No. 4,881,824 issued Nov. 21, 1989. Whenever and wherever possible, it is desirable, especially for cost considerations, to use an expendable thermocouple device as many times as possible in the molten metal bath. Varying the time between immersions can substantially affect the life of the thermocouple and the cost per temperature reading. Short times between immersions and/or longer immersion times can result in the build-up of excessive conductive and radiant heat with resultant overheating of the expendable thermocouple sensor cold junction and connector, permanent connector housing, and the immersion lance pole.

This overheating creates several very undesirable results, including but not limited to reducing the life and accuracy of the thermocouple, thus leading to unreliable temperatures even though temperatures continue to be obtained by the operator. A secondary thermocouple forms at the cold junction points between the thermocouple connector tip lead wires and the permanent connector ring and stem. Significant temperature changes at the cold junction and the resultant development of a secondary thermocouple can cause temperature readings to be inaccurate. The cold junction must remain at a relatively constant temperature in order to prevent secondary thermocouple affects from impairing the accuracy of the temperature measuring system. The continuity, life and accuracy of the system can also be destroyed by the melting of the insulating composition or other parts in the sensor, sensor connector, permanent connector and housing, lead wires, or other parts in the thermocouple pole assembly.

The components of the tip of the expendable device may contain paper, plastic, or a combination thereof which, if overheated, can melt or burn, thus destroying the device and its integrity prematurely. Also, the insulating housing of the permanent connector may melt or burn at high temperatures.

SUMMARY OF THE INVENTION

It is a principal object of the present invention to increase the accuracy and extend the number of uses, often by twofold or more, of a thermocouple sensor by reducing and eliminating the foregoing described problems. A further object is to provide a system for continuously cooling and maintaining the expendable thermocouple, the connector, the immersion pole, the lead wires, and other related parts at a constant temperature while monitoring the internal temperature of the system as taught in U.S. Pat. No. 4,863,283. Another object is to provide expendable thermocouple sensor parts and permanent connectors and housing parts and immersion poles into which passages are incorporated to permit a stream of constant temperature cool dry air or other gaseous medium to be passed continuously under low pressures through the devices at appropriate volume to stabilize and control the temperature of the foregoing parts, and thus increase the life and accuracy of each expendable thermocouple.

The permanent connector components are normally contained in a non-conductive, high melting point, insulated housing which in turn is carried in or contained within an external metal housing. In accordance with the invention, a source of air or other cooling gas is connected to openings in the connector. One or more longitudinal openings are provided through the inside of the connector to permit a stream of cooling gas to flow therethrough. The flow of gas passing through the immersion lance cools the immersion lance pole which contains the electrical lead wires leading to the connector, and thus also cools the lead wires. The gas upon entering and passing through the non-conductive connector through the internal longitudinal openings then flows outwardly through the radial openings between the inner insulative connector and the expendable tip to the space between the outer metal housing and the tip, around the end and out between the inside of the expendable tip and the outside of the metal housing. The gas or other cooling medium thus cools the complete permanent connector system, including the housing and the expendable thermocouple sensor tip it is mated with.

Longitudinal and radial holes in the permanent insulative connector may also be provided for flow of the cooling medium. The cooling air is exhausted between the pole and the thermocouple's inner protective wall into the atmosphere.

In the preferred embodiment, four radial holes are provided for air flow from the central longitudinal opening through the connector system. Additionally, the connector is mounted in the metal housing by means of a pair of hollow pins, one on each side of the central opening. The hollow pins provide additional flow passages for the cooling air to flow from inside of the connector to the outside of the housing.

The central opening provided in the insulating connector and its housing allows for passage of cooling gases from a source of cooling gas under pressure through the hollow lance pole with which the cooling gas is in fluid communication. The radial openings through the connector permit flow of gases from the central opening to the exterior of the connector and interior of the outer housing around the end and over the outside of the outer housing, between it and the inside of the expendable thermocouple where they are vented to the atmosphere. The optional longitudinal openings on the outside of the connector also allow the cooling gas to flow in and around the socket or the connector system and around the expendable thermocouple sensor assembly itself. Preferably four or more radial openings connected to the interior longitudinal openings provide a uniform flow of cooling gas to the internal part of the connector. A channel for venting of air to the atmosphere is provided between the outside housing and the inner non-conductive housing by providing tolerances between the two or utilizing formed, grooved channels.

More specifically, the invention provides a gaseously cooled expendable thermocouple for immersion into a molten metal bath which results in the cooling of the pole, the inner wiring, the non-conductive inner connector, its outer housing, the thermocouple sensor tip itself, and the components which make up the permanent connector, the housing and expendable thermocouple sensor tip.

The expendable thermocouple has a hot junction contained within a protective tube such as fused quartz or Vicor (T.M.) glass in the shape of a "U" Bend which supports the platinum/rhodium thermocouple and protects the thermocouple itself from the molten metal into which the thermocouple is repeatedly immersed. The thermocouple has an internal cold junction at the weld of the platinum platinum/rhodium sensor wire and copper alloy wires. The cold junctions where the platinum lead wires join the copper lead wires are potted in a high temperature protective insulating non-conductive ceramic cement. The cooling air maintains the metal-to-metal cold junctions and connections within the permanent connector and expendable thermocouple sensor within the optimum temperature range. This temperature range can be monitored by an internal thermocouple as described in U.S. Pat. No. 4,863,283 issued Sept. 5, 1990. Means is provided to connect the thermocouple sensor and permanent connector and housing to the electrical lead wires leading therefrom to equipment which is capable of reading and converting the EMF into a temperature through a computer digitally or on a chart type recorder.

A non-conductive insulating housing supports a copper ring and copper alloy stem in the connectors which make contact with the copper and copper alloy connectors from the expendable thermocouple tip. A high temperature non-conductive resin is molded around the ring and stem which electronically insulating them and the lead wires from one another.

In the preferred embodiment, first and second thermocouples are provided in accordance with the teachings of U.S. Pat. No. 4,863,283 so that the internal thermocouple system can be monitored to detect overheating or possible incorrect sensor readings thereof in accordance with the teachings of that patent. In such embodiment a second thermocouple is installed in the electrical connector tip for sensing the temperature change of the internal copper and alloy parts of the connector. This allows the monitoring of the temperature at the cold junctions. When heating occurs, a secondary thermocouple develops, thus eliminating the accuracy of the primary thermocouple sensor.

A second thermocouple is formed when metal wires of dissimilar compositions are allowed to change in temperature. The air cooling helps to prevent and eliminate this in both the connector, the expendable thermocouple sensor itself, and the entire system while the inner thermocouple depicted in U.S. Pat. No. 4,863,283 monitors changes, this allows the operator to take corrective action, reference the cooling system, or to recognize erroneous results, as temperature changes within the thermocouple system itself become immediately apparent.

DESCRIPTION OF THE DRAWINGS

The invention will be further explained with reference to the following detailed description and accompanying drawings wherein:

FIG. 1 is a perspective view of a thermocouple lance of this invention with various parts shown schematically;

FIG. 2 is a fragmentary cross-sectional view of the submersible end of a thermocouple lance and sensor of this invention;

FIG. 3 is a cross-sectional view taken along line 3—3 of FIG. 2;

FIG. 4 is a cross-sectional view of the metal housing and connector housing taken along line 4—4 of FIG. 2; and, FIG. 5 is a perspective view of an electrical connector in accordance with the invention removed from the metal housing and with the electrical leads broken away.

DESCRIPTION OF A PREFERRED EMBODIMENT

As seen in FIGS. 2, 3 and 5, one electrical connector, stem 10, projects from a non-conductive plug housing 12. The electrical connector or plug 10 is insulated from a second concentrically disposed electrical connector, ring 14, by means of a ring 16 of electrically insulating material. Electrical connectors 10 and 14 are adapted to electrically connect with leads 18 and 19, respectively, of a thermocouple 21 consisting of dissimilar wires (such as platinum, platinum/rhodium alloy) housed in a U-shaped fused quartz tube 22. Leads 18 and 19 are carried within a tube 20 of insulative protective material, which may be cardboard or plastic. The electrical connectors 10 and 14 are electrically connected to leads 24 and 26. In the preferred embodiment a dissimilar (constantin) electrical conductor 28 is also connected to one of the electrical connectors, in the illustrated case, copper connector 14, in order to form the hot junction of a second thermocouple. This second thermocouple can be used to sense the temperature in the connector/cold junction of the principal thermocouple in accordance with the teachings of the above noted U.S. Pat. No. 4,863,283.

In accordance with the teachings of the present invention radial bores 11 and 13 extend through electrical connectors 10 and 14 and through insulation 16 from a central longitudinal bore 15 that passes through the length of the connector 10 and insulating connector housing 12. Connector housing 12 is contained within an outer, preferably metallic, housing 23 which is preferably threaded, pinned or otherwise affixed to the principal lance pole 25 as seen in FIGS. 1 and 2. Lance pole 25, which is preferably in the form of a hollow metal pipe or conduit, is preferably cooled by encircling cooling coil 27. Coil 27 is connected to an inlet 36 for cooling fluid or water from any appropriate source, and to an outlet 35 for discharge of water flowing out from coil 27. A cooling gas can be fed under low pressure, below 10 psi, and preferably about 5 to 7 psi through the interior of conduit 25 into central bore 15. A higher pressure (e.g. 110 to 120 psi) source 37 of compressed air or other nonreactive gas such as nitrogen or argon is preferably fed through a water trap 38 into a pressure regulator 39 and thence by means of appropriate conduits into the interior of conduit 25 to provide the source of cooling gas.

Numeral 40 indicates a temperature recording unit of known construction such as a digital recorder, pyrometer, or computer which is remotely connected to leads 24 and 26 from the thermocouple connector 10, 14, which are electrically connected to thermocouple 21 by leads 18 and 19. Leads 26 and 28 are connected to a second appropriate temperature recorder 55 to enable indication and recording of the temperature of the internal areas of the permanent connector and housing. Plug housing 12 is preferably secured to outer housing 23 by means of two hollow pins 30 and 32 which are fitted through a bore 33 through housing 12 and aligned holes through housing 23. As best seen in FIG. 4, the hollow configuration of the securing pins 30 and 32 permits an additional flow of air from central bore 15 to the outside of housing 23 where it can flow outwardly through space or clearance 17 between housings 23 and 46 as indicated by arrows 45. Grooves 51 can optionally be provided longitudinally on the exterior of housing 12 (FIGS. 4 and 5) in order to increase the area available for inflow of cooling gas.

As is already known in the art, the thermocouples can be formed from dissimilar materials such as platinum and platinum-rhodium, copper-constantan, iron-constantan, chromel-alumel or others. Housing 46 can be formed from non-conductive materials such as roll cardboard in the form of a tube. The outer layer or heat resistant housing 47 of the thermocouple is generally formed of a high alumina ceramic/fiber type material, or its equivalent, which is formed bonded together by a silicate or starch binder.

The central core or plug 49 is formed of an appropriate high temperature insulating, heat resistant refractory material conventionally used to protect an support the fused quartz tube 22 within outer refractory housing 47. A coating 52 of refractory wash or cement can be coated over the end of the central core. High temperature, electrically insulating refractory potting material 53, contained by ceramic or paperboard housing 54, may be used to insulate and protect the thermocouple cold junction from the heat of the metal bath as well as support the fused quartz tube 22.

Plug housing 12 is usually formed from a insulating thermoset material such as a phenolic resin, epoxy resin or the like. Connectors 10 and 14 are preferably made from copper or copper-containing alloys, but other electrically conductive materials could be substituted.

While the preferred thermocouple construction which has been illustrated includes a dual thermocouple arrangement as explained above, the air cooling principle of the present invention applies as well to a temperature sensor which contains only the primary single thermocouple. In either event, the life and accuracy of the temperature sensor is significantly increased by the ability to cool the parts surrounding the thermocouple cold junction. It will be noted that the flow of air 45 will cool the connector, connector housing, wires, lance pole 25 and the paper tube 46 as well as tube 20. It is also possible to cool the cold junction even further by incorporating passages 56 into the expendable thermocouple tip itself. It will also be noted that when the thermocouple is removed from the connector tip, additional volumes of air can pass straight through the connector plug 15, cooling it and the balance of the connector components even more rapidly.

Various other modifications of the embodiments disclosed herein will be apparent to those skilled in the art as the scope of the invention as defined in the claims appended hereto.

We claim:

1. In a temperature measuring device provided for immersion in a molten metal bath which comprises a thermocouple having a hot junction contained within a protective tube and a cold junction contained within a heat-resistant housing, means for supporting the thermocouple within the housing, a pair of electrical connectors electrically insulated from each other contained within the housing with each connector being in electrical connection with one of the wires leading from the thermocouple cold junction, said connectors being supported in and extending from a non-conductive plug housing, a metal housing supporting said plug housing and being fitted within said heat resistant housing, the metallic housing being affixed to the end of a hollow lance pole, circuit means connected to the thermocouple by means of electrical wires contained within said pole for providing temperature readings based on electromotive force generated by the thermocouple, the improvement which comprises:

a source of cooling gas in fluid flow communication with the interior of said hollow lance pole, and therefrom to an opening passing through said plug housing for flow of cooling gases, said opening being in fluid flow communication with at least one opening through said plug housing which permits flow of said gases from within said plug housing outward to a space around the thermocouple cold junction and around the exterior of said metal housing, there being a channel surrounding said metal housing that is vented to the atmosphere.

2. A temperature measuring device according to claim 1 wherein said cooling gas is air, nitrogen, or argon under low pressure.

3. A temperature measuring device according to claim 1 comprising a second thermocouple having its hot junction adjacent to the cold junction of said first mentioned thermocouple, said second thermocouple being connected to means for monitoring the electromotive force generated thereby.

4. A device according to claim 1 wherein four radial openings are provided to permit flow of said cooling gas from the opening through said plug housing to the exterior of said pair of electrical connectors.

5. A device according to claim 1 wherein said plug housing is affixed to said metal housing by means of hollow pins which permit flow of said cooling gas from said central opening to the exterior of said metal housing.

6. A device according to claim 1 wherein said channel for flow of said cooling gas comprises the space between the interior of said heat-resistant housing and the exterior of said metal housing.

7. A gaseously cooled thermocouple lance for immersion in a molten metal bath comprising:

a. a first outer heat resistant housing;
b. a thermocouple having a hot junction contained within a protective tube and a cold junction contained within said housing;
c. means for supporting the thermocouple within the housing;
d. a pair of electrical connectors electrically insulated from each other, each connector being in electrical connection with one of the wires leading from the thermocouple cold junction, said connectors being supported in and extending from a non-conductive plug housing;

e. a metal housing supporting said plug housing and being fitted within said heat resistant housing;

f. a central opening through said plug housing for passage of a cooling gas, said opening being in communication with at least one radial opening through said electrical connectors to permit flow of said gas therethrough to the exterior surface of said metal housing;

g. a hollow lance pole affixed to an end of said metal housing having a central opening containing electrical wires connected to said thermocouple;

h. a fluid flow path within said heat resistant housing for passage of said cooling gas around said metal housing and thereafter to the atmosphere;

i. a source of said cooling gas under pressure in fluid communication with the interior of said hollow lance pole and therefrom to said central opening;

j. circuit means connected to the thermocouple for providing temperature reading based on electromotive force generated by the thermocouple.

8. A gaseously cooled thermocouple lance according to claim 7 wherein the exterior of said plug housing is provided with longitudinal grooves for flow of said cooling gas.

* * * * *